March 8, 1932. T. H. STRACHAN 1,848,208
SHIPPING BRACKET
Filed Nov. 21, 1928 2 Sheets-Sheet 1

March 8, 1932.  T. H. STRACHAN  1,848,208
SHIPPING BRACKET
Filed Nov. 21, 1928  2 Sheets-Sheet 2

Inventor
Thomas H. Strachan
By his Attorney
W. M. Wilson

Patented Mar. 8, 1932

1,848,208

UNITED STATES PATENT OFFICE

THOMAS H. STRACHAN, OF LYNBROOK, NEW YORK, ASSIGNOR TO DAYTON SCALE COMPANY, OF DAYTON, OHIO, A CORPORATION OF NEW JERSEY

SHIPPING BRACKET

Application filed November 21, 1928. Serial No. 320,861.

This invention relates to devices to be applied to weighing scales of the type disclosed in the patent to Strachan, No. 1,623,137, dated April 5, 1927.

More particularly the object of the invention is to provide a shipping attachment for application to a weighing scale to hold all of its movable parts stationary to prevent damage to these and other parts when shipping the scale.

Further, the object of the invention is to provide such a shipping attachment which may be easily applied at the factory and readily removed at the destination of the scale by an inexperienced person.

Still further, the object of the invention is to provide a device which by application to one movable part, will prevent movement of all the other movable parts.

Still another object of the invention is to provide a shipping attachment consisting substantially of sheet metal and which may be manufactured easily and at very low costs.

Other objects and advantages will be hereinafter set forth in the specification and claims and shown in the drawings which by way of illustration show a preferred embodiment of the invention.

Figure 1:
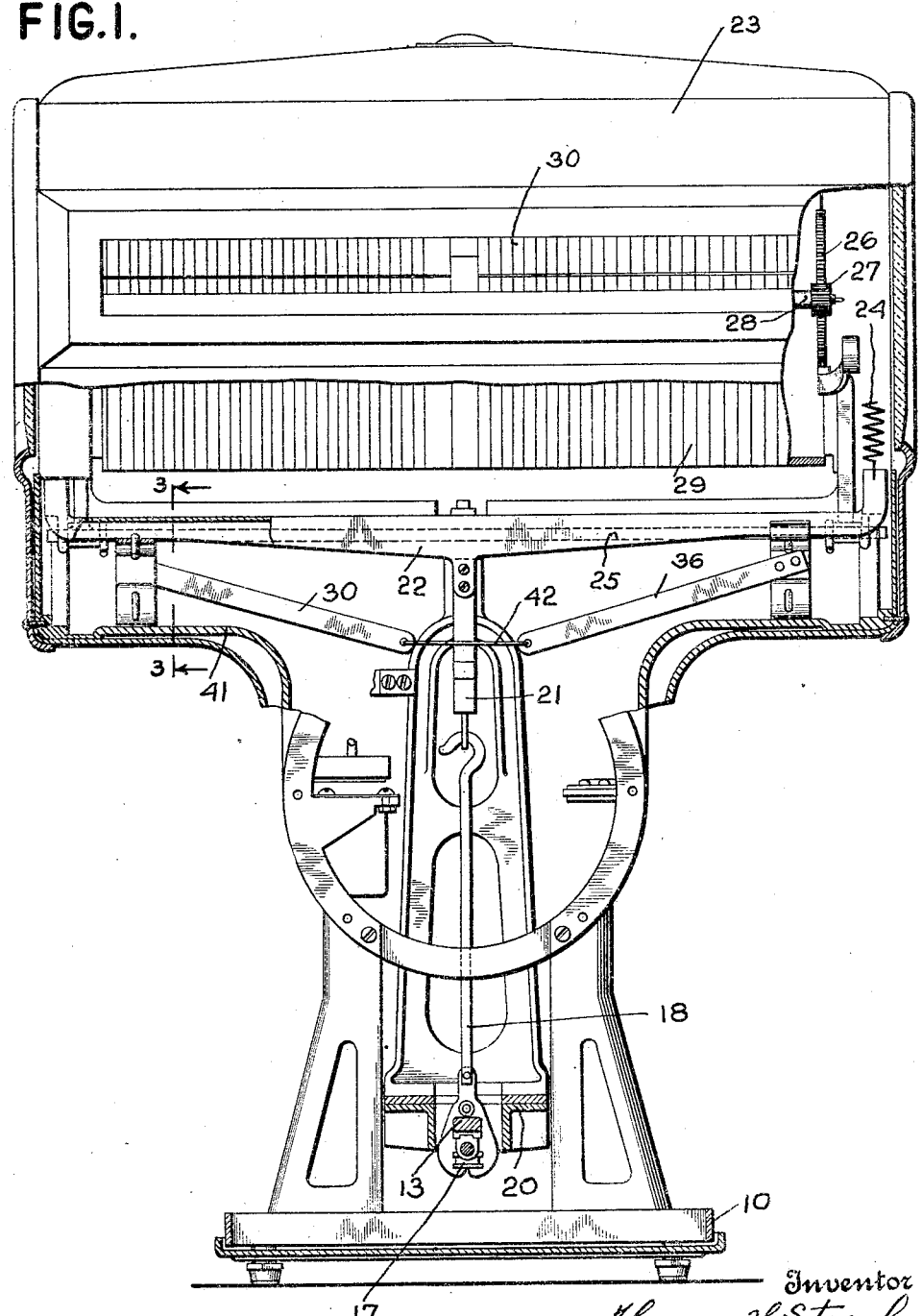
Fig. 1 is a section through the front part of the housing of the scale showing the shipping bracket in place.

Referring now to the drawings, 10 is the base casting of the scale having a fulcrum stand 11 (Fig. 2) which supports the fulcrum pivots 12 of the lever 13 in the usual manner. The lever is provided with a pivot 14 engaging the load pivots of the platform or pan supporting frame 15. The right hand end of lever 13 (as viewed in Fig. 2) has a pivot 16 coacting with the bearing pieces 17 carried by the lower end of a steelyard stirrup 18. Adjacent pivot 16, lever 13 has on its upper edge a lug 19 adapted to limit the movement of lever 13 counterclockwise by contact with the bottom of frame plate 20.

The upper end of the stirrup 18 is hooked to a load counterbalancing connecting element 21 (Fig. 1). The element 21 is fastened to a horizontal member 22 which is positioned longitudinally of the drum casing 23. Each end of the member 22 is bent upwardly and has attached thereto the end of a load offsetting spring 24. A rack carrying bar 25 is fixed to member 22 for movement therewith during weighing operations. The bar 25 has fixed to each end thereof racks 26 (Fig. 1) meshing with pinions 27 on the shaft 28 carrying the drum chart 29 which is readable through a longitudinal window 30 in the drum casing.

Figure 4:
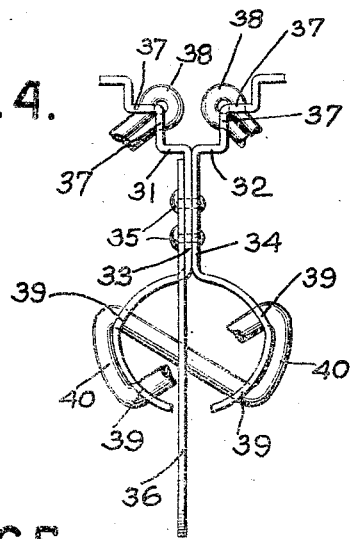
Fig. 4 shows a front view of the shipping attachment.
Figure 3:
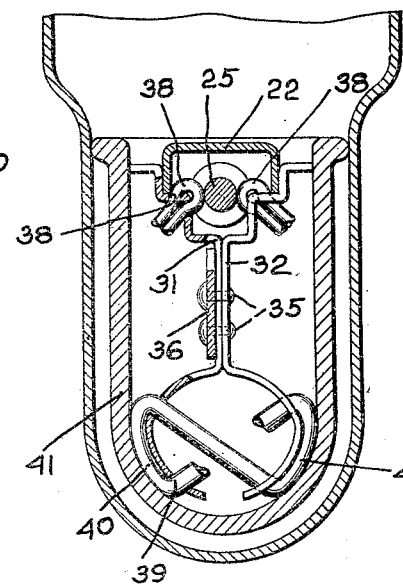
Fig. 3 is a section on line 3—3 of Fig. 1.
Figure 5:
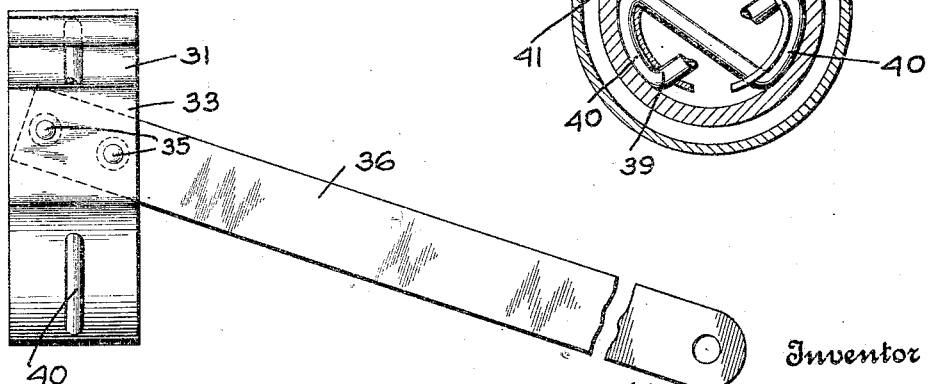
Fig. 5 is a side view of the same.

After all the aforesaid parts have been assembled, the shipping bracket forming an essential part of my invention is applied to the scale and is effective to hold all the normally movable parts fixed against movement. Each bracket consists substantially of two blades 31 and 32 which are bent manifoldly and rectangularly at their upper portion as may be seen from the drawings and have a substantially circular shape on their lower portion. The intermediate parts 33 and 34 are connected to each other by rivets which also fasten to the bracket a sheet metal plate 36 serving as a handle for convenience in manipulating the bracket into and out of position in the scale. The upper portion of bracket blades 31 and 32 is provided with holes 37 through which a trace 38 of rubber or any other yieldable material is forced so as to form a round shape on the inner side of the bracket (Fig. 4). The lower circular parts of blades 31 and 32 are also provided with holes 39 through which also a trace of rubber is forced conforming with its portions 40 to the lower circular parts of the bracket as will be recognized from Fig. 4. It will be seen that the upper and lower parts of the bracket and the rubber traces respectively are shaped to substantially conform to the shape of the bottom of the horizontally extending channel portion 41 of the scale housing (see Figs. 1 and 3) and that shaft 25 is located between the upper rubber traces 38, while member 22 passes between the rectangular portions of the upper part of blades 31 and 32 of which the end portions engage the legs of the U-shaped channel 41 to prevent lateral movement of member 22. The circular portions of sheet metal blades 31 and 32 are flexible and may be sprung toward each other. When placed in channel 41, the circular portions are gradually flexed towards each other as the bracket is moved from the mouth or wide portion of the channel at the center of the scale towards the narrower portion of the channel at one end of the scale (see Fig. 1). Thus, the tendency of the circular portions when in the position shown in Fig. 3 is to spring outwardly back to normal position. Consequently, the circular portions grip the interior of channel 41 with a good deal of force and prevent the dislodging of the bracket from set position during shipping.

Figure 2:
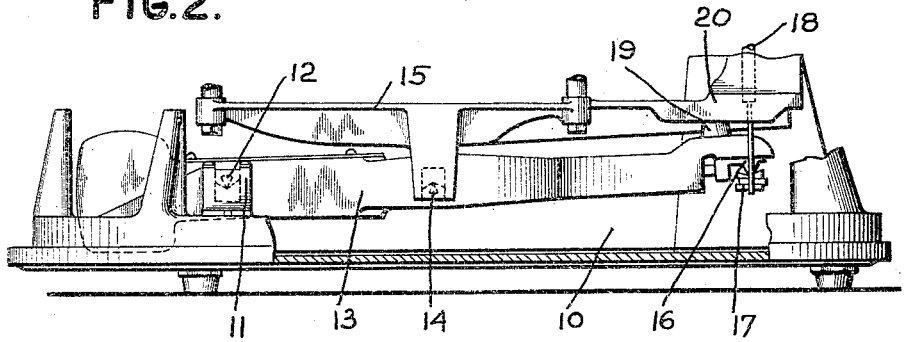
Fig. 2 is a side view of the lower portion of the scale.

In the use of the above described shipping bracket, the front of the scale housing is opened to permit access to the drum casing. The handle 36 of a bracket is then grasped by the operator and the bracket moved into the position shown in Fig. 1. A similar bracket which conveniently may be connected with the other one by a wire or cord is moved to a similar position on the other side of the scale, the position of the parts of the scale then being as shown in Figs. 1, 2 and 3. The placing of the bracket in the positions described raises the members 22 and all the parts connected thereto. Thus the bar 25, the element 21 and stirrup 18 are lifted with the member 22.

The lifting of stirrup 18 results in rocking lever 13 counterclockwise (Fig. 2) until lug 19 thereon contacts the bottom of frame plate 20 which thus prevents further movement of lever 13 and stirrup 18. All the other parts associated with stirrup 18, namely, member 22, rod 25, shaft 28 and drum 29 are also prevented from moving upwardly upon contact of lug 29 with frame 20. The rectangular top portions of the brackets prevent downward movement of these parts by contact with the member 22. The latter and all the parts connected thereto are thus held from vertical and horizontal movement in either direction while the brackets are in position in the scale. As may be seen in Fig. 3 the rectangularly bent upper parts of the brackets prevent lateral movement of the member 22. Rubber traces 38 engages rod 25 on two sides and prevent therefore lateral movement of the same.

When the scale is received at its destination, the front of the scale is again removed and the handles 36 are in convenient reach for pulling out the brackets. The movable parts of the scale are thus returned to their normal operative status.

While I have shown and described and pointed out the fundamental novel features of the invention as applied to a single modification it will be understood that various omissions and substitutions and changes in the form and details of the device illustrated and in its operation may be made by those skilled in the art without departing from the spirit of the invention. I intend to be limited therefore only as indicated by the scope of the following claims:

1. A shipping attachment for weighing scales comprising a sheet metal member consisting of two blade parts shaped symmetrically to each other, each part having a manifold angularly bent portion and a substantially circular portion.

2. A shipping attachment for weighing scales comprising a sheet metal member consisting of two blade parts shaped symmetrically to each other, each part having a manifold rectangularly bent off portion and a substantially circular portion and rubber traces fastened to both portions for yieldable coactuation of said shipping attachment with the scale members.

3. A shipping attachment for weighing scales comprising a member consisting of two sheet metal blades shaped symmetrically to each other, each part having a manifold rectangularly bent off portion, an intermediate straight portion and a substantially circular portion, means to connect both blades at said intermediate portions, a sheet metal handle fastened to said intermediate portions and rubber traces forced into holes of said rectangularly bent off portions and said circular portions of said blades for yieldable coactuation of said shipping attachment with the scale members.

4. A shipping attachment for weighing scales comprising a sheet metal device having oppositely extending legs the outer ends of which are adapted to engage correspondingly opposite walls of a scale element, and parallel substantially opposed portions on said device extending between, joined to, and substantially at right angles to said legs and adapted to receive therebetween a scale element for holding the latter against movement relative to the first-mentioned scale element, and means whereby the device is substantially fixed against movement relative to the first-mentioned scale element.

5. A shipping attachment for scales, comprising a device having oppositely disposed facing rigidly joined portions for receiving and holding between them a scale element against movement, and a plurality of flexible symmetrical clamping portions joined to the first-named portions on said device adapted to be inserted within a scale element separate from but adjacent to the first-named element, said flexible symmetrical portions having free ends terminated opposite each other in spaced relationship, said flexible portions being capable of flexing independently of and relatively to the first-named portions to move said free ends relatively apart whereby the flexible portions are adapted to engage the walls of the second-named element and clamp said device to said second-named scale element.

6. A shipping attachment for scales, comprising a device having means at one end for engaging and holding a scale element against movement, and symmetrical curved portions on the other end of said device adapted to be flexed towards each other to be inserted in a scale element separate from but adjacent to the first-named scale element and gripping said second-named scale element with outward pressure to thereby clamp the said device to the second-named element.

In testimony whereof I hereto affix my signature.

THOMAS H. STRACHAN.